United States Patent [19]

Anthony

[11] Patent Number: 4,781,884

[45] Date of Patent: Nov. 1, 1988

[54] DEBRIS CATCHING STRAINER GRID

[75] Inventor: Andrew J. Anthony, Tariffville, Conn.

[73] Assignee: Combustion Engineering, Inc., Windsor, Conn.

[21] Appl. No.: 20,816

[22] Filed: Mar. 2, 1987

[51] Int. Cl.[4] .......................... G21C 1/01; G21C 3/04
[52] U.S. Cl. .................................... 376/352; 376/313; 376/439; 210/521; 210/489
[58] Field of Search ............... 376/352, 439, 442, 313; 210/521, 522, 489

[56] References Cited

U.S. PATENT DOCUMENTS

| | | | |
|---|---|---|---|
| 3,833,471 | 9/1974 | Chetter | 376/442 |
| 3,982,994 | 9/1976 | Jabsen | 376/442 |
| 4,125,435 | 11/1978 | Jabsen | 376/442 |
| 4,165,256 | 8/1979 | Jabsen | 376/442 |
| 4,585,616 | 4/1986 | DeMario et al. | 376/439 |
| 4,594,216 | 6/1986 | Feutrel | 376/442 |
| 4,652,425 | 3/1987 | Ferrari et al. | 376/313 |
| 4,659,541 | 4/1987 | Rylatt | 376/442 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |

FOREIGN PATENT DOCUMENTS

| | | | |
|---|---|---|---|
| 2743436 | 4/1979 | Fed. Rep. of Germany | 376/442 |
| 0066185 | 6/1977 | Japan | 376/442 |
| 0102493 | 8/1979 | Japan | 376/352 |
| 7209513 | 1/1973 | Netherlands | 376/442 |

Primary Examiner—Harvey E. Behrend
Attorney, Agent, or Firm—John H. Mulholland

[57] ABSTRACT

A debris catching strainer grid for capturing and retaining deleterious debris carried by reactor coolant before it enters the active region of a fuel assembly and creates fuel rod cladding damage has a plurality of fuel end cap compartments defined by pairs of first and second intersecting and slottedly interlocked grid-forming strips attached to a perimeter member and to each other. The end cap compartments defined by strips including vertical rows of integral leaves on opposite sides of the strip or by pairs of adjacent integral leaves intermediate their intersections. In the latter case, each leaf of the pair of leaves is the mirror image of the other leaf of the pair with an asymmetric shape with the greatest distance of projection out of the plane of the strip remote from the midpoint of the strips between their intersections.

4 Claims, 6 Drawing Sheets

DEBRIS CATCHING STRAINER GRID

FIELD OF THE INVENTION

This invention relates to nuclear reactor fuel assemblies and in particular those assemblies which include spaced fuel rod support grids mounted in a reactor core as a unit. The fuel rods are held between an upper end fitting and a lower end fitting by means of spacer grids. The reactor coolant flows upwardly from holes in the lower end fitting along the fuel rod lower end caps and upwardly along the fuel rod cladding and through the spacer grids in the active region of the fuel assembly.

BACKGROUND OF THE INVENTION

Debris in the coolant which collects or is trapped in fuel rod spacer grids is believed responsible for as many as 30% of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. The size and shape of the debris capable of causing severe damage is quite variable. In fact, metal fragments which can only be picked up with tweezers have been known to "drill" a hole in fuel rod cladding in less than 1,000 hours of reactor operation. Since most failures occur either within or below the first spacer grid, the grids apparently provide a rather good screen for collecting debris. In order to prevent damage in the active area of the reactor, Applicant set out to design a grid structure for straining debris which: has a good probability of filtering out particles that could cause cladding damage: does not significantly increase fuel assembly uplift; does not significantly alter existing proven designs: will not jeopardize fuel rod support: will not hinder fuel assembly reconstitutability; will not significantly compromise fuel performance; has high mechanical integrity; is cost effective considering the risk/benefit; will not significantly infringe fuel rod plenum volume; and, does not require unplanned out-of-reactor flow testing.

SUMMARY OF THE INVENTION

The invention is an "egg crate" type strainer grid which is welded to the upper surface of the lower end fitting. The grid is only approximately ⅔ of an inch high and is placed in the region of the fuel rod lower end caps but does not provide any fuel rod support. The individual grid strips are pierced and stamped to include arch-type leaves at various elevations. The leaves are alternately stamped 180° opposite each other. The leaf with the largest projection is on the bottom of the strip with each succeeding leaf projecting lesser than the one below. The design has the leaves minimizing pressure drop by presenting an edge to the coolant flow and being in rather close proximity to the contour of the end caps so as to provide a means for trapping debris against the end caps. Since the end caps rre of solid material they are capable of accepting a great deal of wear without penetrating the fuel barrier. While one embodiment shows only four leaves per strip, more or less are possible. The grid strip thicknesses is related to the number of leaves but may be as thin as 12 mils to minimize overall fuel assembly pressure drop. The novel strainer grid is more effective in collecting debris than a standard spacer grid because the largest diameter in flat shaped openings through a strainer grid made according to the principles of the invention are typically 0.090 inches and 0.16 inches, respectively. This compares with similar openings in a standard fuel rod spacer grid complex of 0.14 and 0.41 inches, respectively. Furthermore, when debris collected in the strainer grid and contacts fuel rod end caps, no ensuing fuel rod failures will occur because the wear takes place in the solid region of the fuel rods, namely its end cap, as opposed to in the hollow clad portion in the active region of the fuel assembly.

The shape and orientation of the strainer grid leaves can be important in optimizing collection efficiency and pressure and maintaining relatively low pressure drops. The calculated pressure through the strainer grid of the invention as described above is about 0.4 psi which represents a 3% increase in the total pressure drop across a fuel assembly. A typical screen or perforated metal plate with even larger openings (0.187 inches diameter) results in an overall increase in fuel assembly pressure drop of more than 17%.

While the strainer grid of the invention will not entirely eliminate debris related failures, it has the potential for greatly reducing the number of failures. It also provides a side benefit of breaking up jets eminating from the flow holes in the lower end fitting flow plate, thereby further reducing the probability of fuel rod failures due to fretting or vibration in the critical entrance region of the fuel assembly.

PREFERRED EMBODIMENTS OF THE INVENTION

Figure 1:
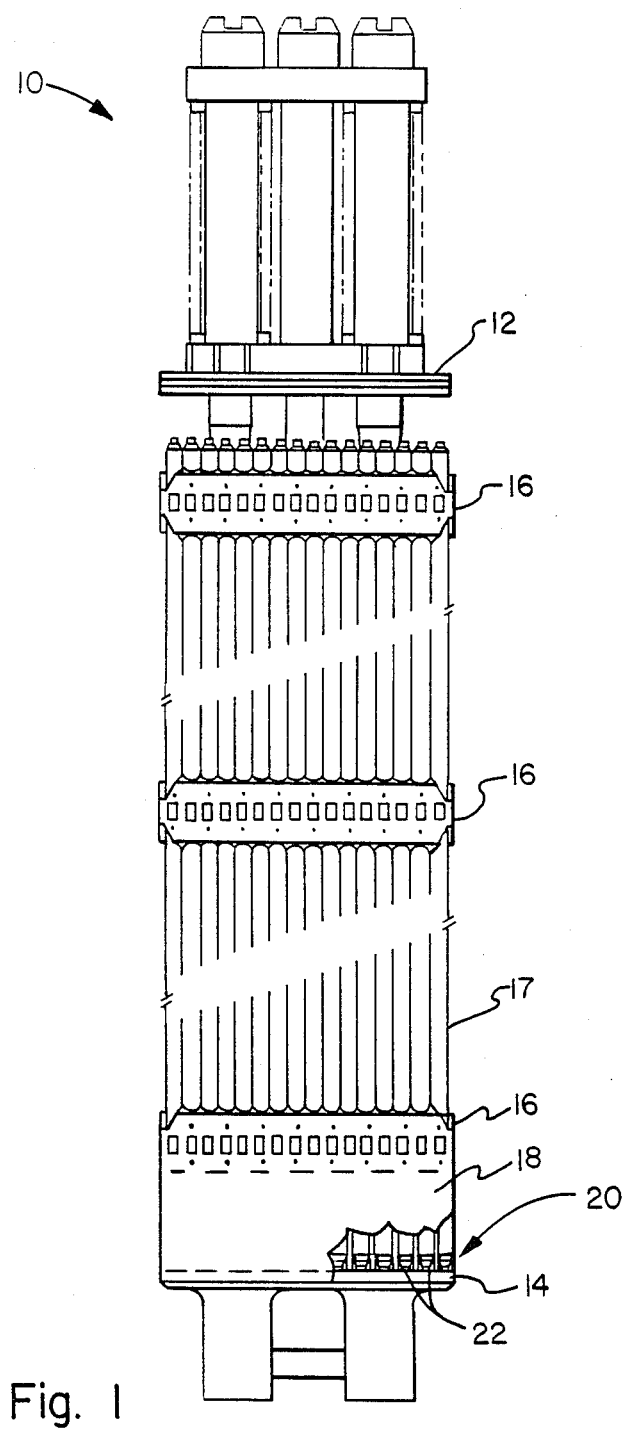
FIG. 1 is a side elevational view of a fuel assembly configuration including the debris catching strainer grid of the invention welded to the lower end fitting.

The numeral 10 generally designates a fuel assembly unit. The fuel assembly 10 includes an upper end fitting 12, a lower end fitting 14, spacer grids 16 supporting fuel rods 17, and a skirt portion 18 shown partially broken away in FIG. 1 to illustrate a debris catching strainer grid constructed accordingly to the principles of the invention, generally designated by the numeral 20. Behind the skirt 18, within the compartments defined by the debris catching strainer grid 20 and at the ends of fuel rods 17, are solid fuel rod end caps 22. Each fuel rod end cap 22 is located in an end cap compartment of the type illustrated in perspective in FIG. 2. The end cap compartment is defined by pairs of first intersecting and slottedly interlocked grid forming strips 24 known as top grid strips because of their lower slots 27. Strips 24 are for assembly with a second pair of intersecting grid forming strips 26, which are known as bottom grid strips because their slots 27 for slottedly interlocking with the grid forming strips 24 are located and along their upper margin. When assembled, the strips 24 in the area of intersection are above the strips 26. The pairs of first and second intersecting and slottedly interlocked grid forming strips 24 and 26 are attached to the perimeter strip 28 shown in detail in FIGS. 10, 11 and 12.

Figure 2:
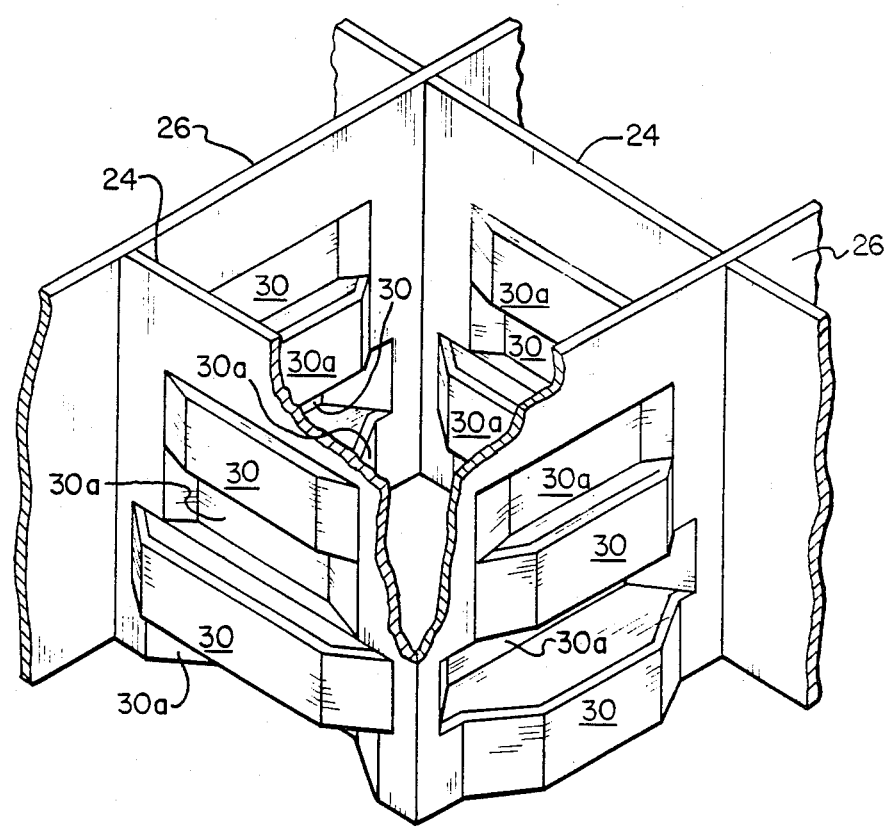
FIG. 2 is an isometric view of a fuel rod end cap compartment illustrating a preferred embodiment of the invention.
Figure 3:
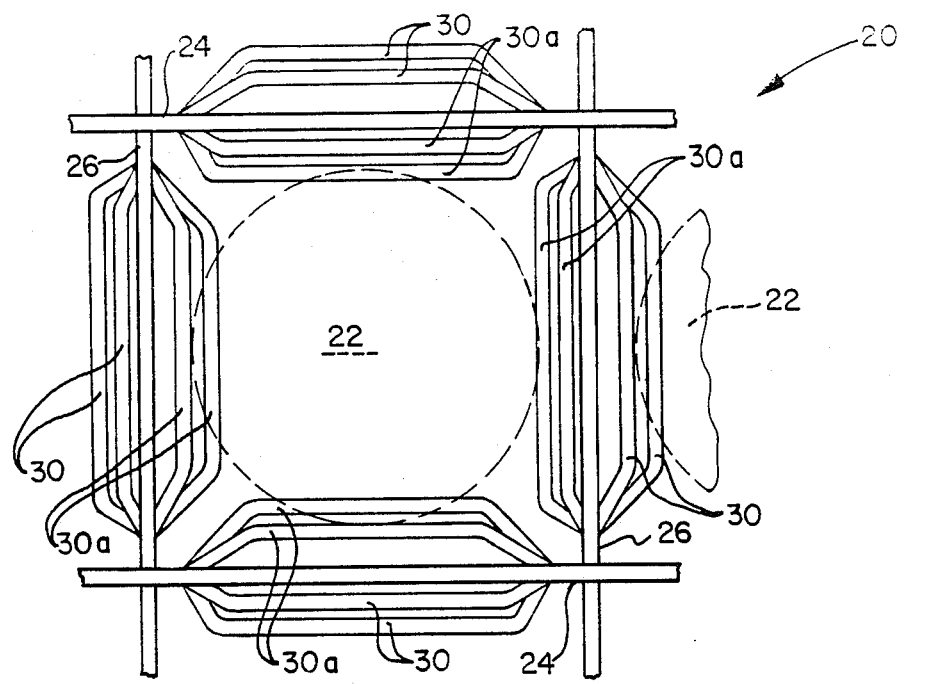
FIG. 3 is a plan view of the compartment of FIG. 2.
Figure 4:
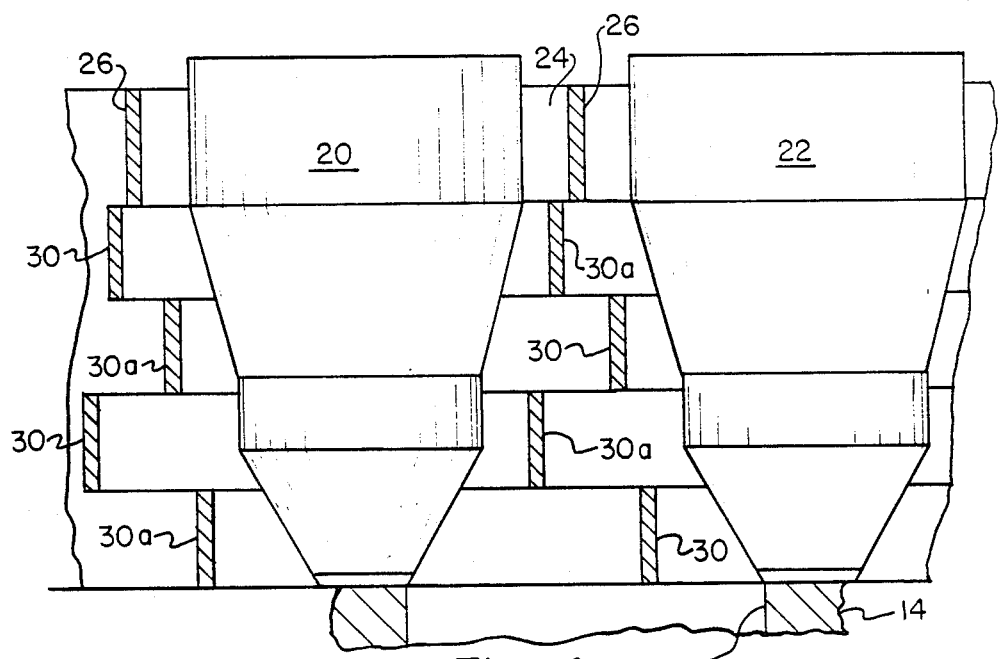
FIG. 4 is a side elevational view of the compartment of FIGS. 2 and 3 showing an adjacent fuel rod end cap in a fragmentary portion of the lower end fitting with a flow hole therein over which the strainer grid is attached.
Figure 5:
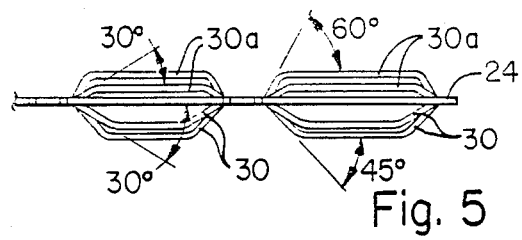
FIG. 5 is a plan view of a portion of a top grid strip utilized to produce the embodiment illustrated in FIGS. 2-4.
Figure 6:
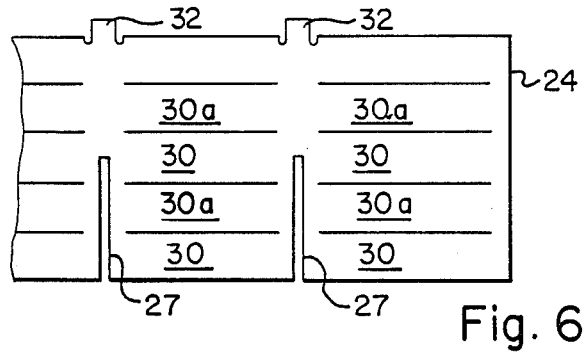
FIG. 6 is a front elevational view of the top grid strip portion of FIG. 5.
Figure 7:
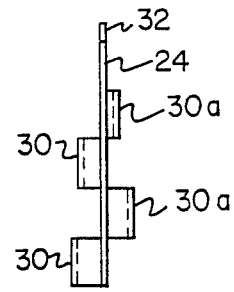
FIG. 7 is an end elevational view of the top grid strip portion of FIGS. 5 and 6.
Figure 8:
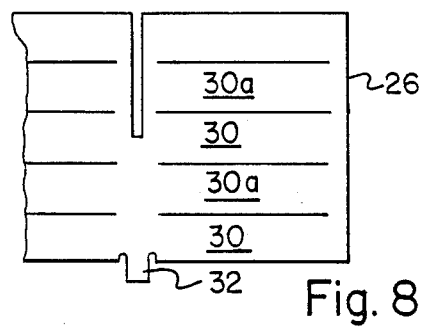
FIG. 8 is a front elevational view of a portion of a bottom grid strip for use with the top grid strip of FIGS. 5-7.
Figure 9:
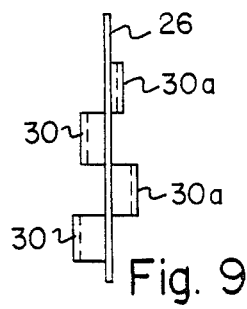
FIG. 9 is an end elevational view of the bottom grid strip portion of FIG. 8.

The end cap compartments, as can be seen in FIG. 2, include vertical rows of integral leaves 30 intermediate their intersection of the pairs of first and second intersecting and slottedly interlocked strips 24 and 26. Each of the leaves 30 of a vertical row have a distance of projection out of the plane of its respective strip 24 or 26 different from the others of its row with the lower leaf 30 projecting out of the plane of its strip the most, while each successive leaf in the row as flow proceeds upwardly past it, projects a lesser amount. Collectively, these rows act as a strainer to prevent debris from leaving the inactive region of the fuel assembly in the area of skirt 18 and fuel rod end caps 22 and proceeding along the fuel rods 17 into the active region of the fuel assembly 10 along the sides of the cladding of fuel rods 17. The rods 17 are hollow and filled with fuel material in the active region as opposed to being solid in the fuel end cap region. As seen, for example, in FIG. 2, each of the leaves 30 in a vertical row is spaced from its adjacent leaves 30 in the row by an amount equal to the width of a leaf 30a in a row on the opposite side of the strip of which it is integral. For convenience, the designation 30 has been made for leaves which extend outwardly from the compartment illustrated in FIGS. 2 through 4 and the designation 30a is given to leaves which extend inwardly into the compartment illustrated in FIGS. 2, 3 and 4.

FIGS. 5 through 9 show the details of the strips utilized in making up the embodiment of the strainer grid 20 of which the compartment shown in perspective in FIG. 2 is a part. The fragmentary strips 24 and 26 illustrated in FIGS. 5 though 9 include weld material tabs 32 to provide material for nugget welds when the strips 24 and 26 are in assembled grid-like condition.

Figure 10:
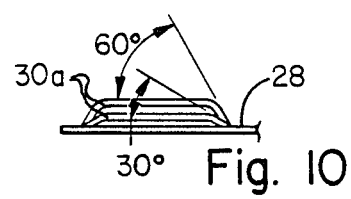
FIG. 10 is a top plan view of a portion of a perimeter strip for use with the top and bottom grid strips of FIGS. 5-9.
Figure 11:
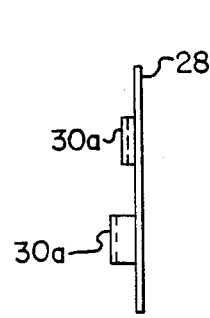
FIG. 11 is an end elevational view of the perimeter strip portion of FIG. 10.
Figure 12:
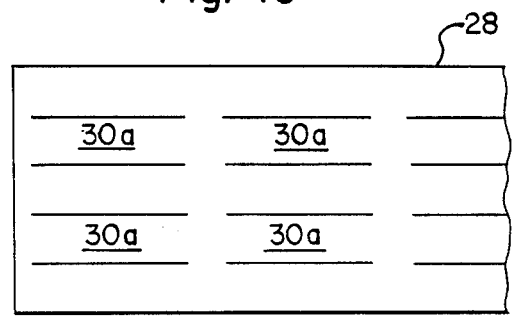
FIG. 12 is a front elevational view of the perimeter strip portion of FIGS. 10 and 11.
Figure 13:
FIG. 13 is a top plan view of a portion of a top grid strip of a second embodiment.
Figure 14:
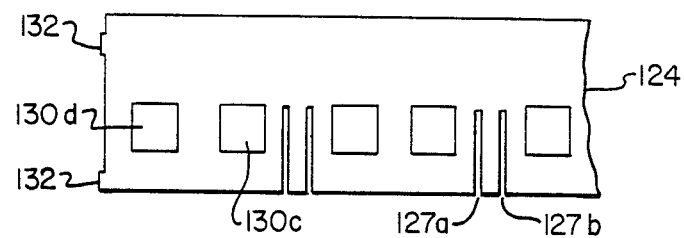
FIG. 14 is a front elevational view of the top grid strip portion of FIG. 13.
Figure 15:
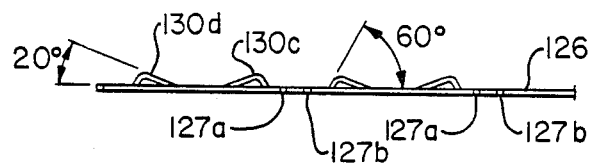
FIG. 15 is a plan view of a portion of a bottom grid strip for use with the top grid strip of FIGS. 13 and 14.
Figure 16:
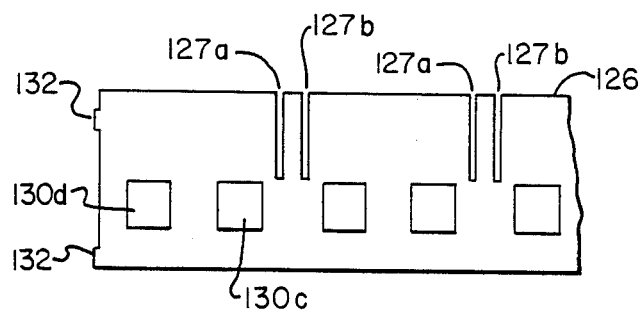
FIG. 16 is a front elevational view of the bottom grid strip portion of FIG. 15.
Figure 17:
FIG. 17 is a plan view of a portion of a perimeter strip for use with the top and bottom grid strips of FIGS. 13-16.
Figure 18:
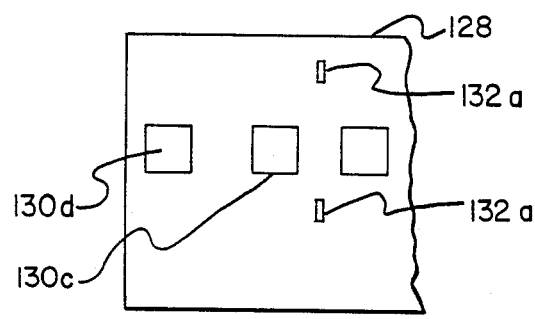
FIG. 18 is a front elevational view of the perimeter strip portion of FIG. 17.

FIGS. 10 through 12 show the perimeter member 28 with its equivalent structure to that of strips 24 and 26 to the extent necessary to make complete compartments on the outside margins on the grid 20. Obviously, only leaves 30a which are inwardly directed toward the compartment are required. In the illustrated embodiment of FIGS. 2 through 12, all of the leaves 30 and 30a are constructed by bending them out of the plane at angles which are multiples of 15°. Thus, the lowermost outwardly extending leaf 30 leaves the plane of the strips 24, for example, at 45° and the next leaf 30 up, at 30°. The lowermost leaf 30a leaves the plane of the strip 24 at 60° and the next uppermost leaf 30a of the inner-vertical row leaves the plane of the strip 24 at 30°. This is the same for the leaves 30a of all of the strips 24, 26 and includes perimeter strip 28.

It will be seen that an effective strainer grid structure is shown by the embodiment of FIGS. 2 through 12, in the form of a grid which is attached, for example, by welding to the upper surface of the lower end fitting 14. The grid is oriented such that the solid fuel rod end caps 22 have the leaves 30 and 30a between them such over a flow hole 34 in the lower end fitting 14. Accordingly, the reactor coolant flow is directly presented to the grid device 20 in a manner in which the grid is likely to collect and retain debris in the reactor coolant flowing through flow hole 34 and upward along and between the solid fuel rod end caps 22.

Figure 19:
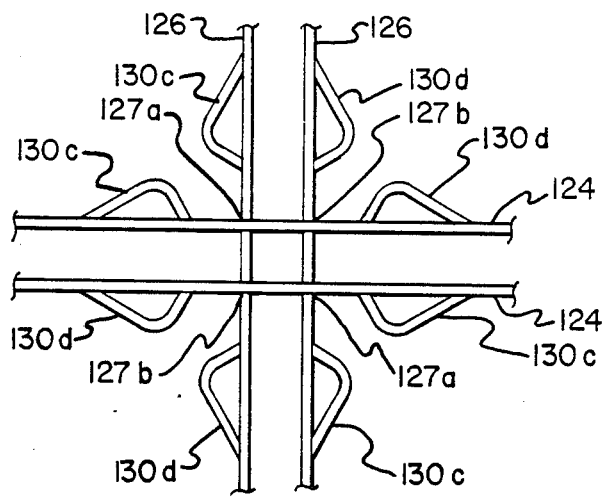
FIG. 19 is a plan view of an intersection of the strainer grid strips of the embodiment of FIGS. 13-18, when assembled, showing a corner of each of four fuel rod end cap compartments.

In the embodiment shown in FIGS. 13 through 19, parts analogous to the parts of the embodiment of FIGS. 2 through 12 are designated with the numeral 1 preceding the other digits of the designating number. Thus, top grid strips 124 and bottom grid strips 126 are utilized as the pairs of intersecting and slottedly interlocking strips in the embodiment of FIGS. 13 to 19 except the strips 124 and 126 are in reality, blanks which are half of a strip in order that double intersections, as shown in FIG. 19, can be produced. To accommodate these double blank intersecting strips, double slots 127a and 127b are provided in the lower margin of blank strip 124 in the upper margin of blank strip 126. A suitable perimeter strip 128 is provided, as shown in FIGS: 17 and 18 into which welding tabs 132 are inserted through holes 132a.

In the case of the embodiment of FIGS. 13 through 19, leaves 130 c and 130d are provided on the blank strips 124 and 126. In this embodiment there are no vertical rows and the leaves 130c and 130d are mirror images of each other designed to coact with the contour of the fuel rod end caps 22. They are of asymmetric shape with the portions of their greatest distance of projection out of the plane of the strips 124 and 126 remote from the midpoint of the strips between their intersections. Since the leaves are in rather close proximity to the contour of the end caps 22, they provide a means for trapping debris against the end caps 22. The end caps 22 are of solid material and are therefore capable of accepting a great deal of wear without penetration of the fuel barrier.

While the illustrated embodiments show only a limited number of leaves per strip, more are possible. The grid strip thicknesses relate to the number of leaves but they may be as thin as 12 mils to minimize the overall fuel assembly pressure drop. Accordingly, it will be seen that a novel debris catching strainer grid for capturing and retaining deleterious debris carried by reactor coolant before it enters the active region of the fuel assembly and creates fuel rod cladding damage is provided.

I claim:

1. In a nuclear reactor having fuel assemblies including an upper end fitting and a lower end fitting and spaced nuclear fuel rod spacer grids therebetween for supporting and spacing elongated nuclear fuel rods which includes a hollow active portion of nuclear fuel filled cladding intermediate the rod'ends and a tapering end cap of solid material on the rod end which first encounters reactor coolant flow, a debris catching strainer grid for capturing and retaining deleterious debris carried by reactor coolant before it enters the active region of a fuel assembly and creates fuel rod cladding damage, comprising in combination:

a polygonal perimeter, a plurality of fuel end cap compartments defined by pairs of first and second intersecting and slottedly interlocked grid-forming strips attached to said perimeter and to each other, each said fuel rod end cap extending into a respective one of said end cap compartments, at least some of said end cap compartments defined by two pairs of intersecting and slottedly interlocked strips including vertical rows of integral leaves intermediate their intersections, each of said leaves of a row presenting an edge to the coolant flow, being radially adjacent and radially spaced from said fuel rod end caps and having a distance of projection out of the plane of its respective strip different from the others in its row, and means for attaching said debris catching strainer grid to the lower portion of said fuel assembly.

2. The debris catching strainer grid of claim 1 in which each of the leaves of a row are spaced from its adjacent leaves in the row by an amount equal to the width of a leaf in a row on the opposite side of the strip.

3. The debris catching strainer grid of claim 2 in which the lower leaf projects out of the plane of its strip the most while each successive leaf in the row, as flow proceeds upwardly, projects a lesser amount.

4. The debris catching strainer grid of claim 1 in which the strainer grid is welded to a lower end fitting of the fuel assembly with which it is associated.

* * * * *